US010706022B2

(12) United States Patent
Gkoufas et al.

(10) Patent No.: US 10,706,022 B2
(45) Date of Patent: Jul. 7, 2020

(54) SPACE-EFFICIENT SECONDARY INDEXING ON DISTRIBUTED DATA STORES

(71) Applicant: INTERNATIONAL BUSINESS MACHINES CORPORATION, Armonk, NY (US)

(72) Inventors: Ioannis Gkoufas, Dublin (IE); Konstantinos Katrinis, Dublin (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 587 days.

(21) Appl. No.: 15/408,726

(22) Filed: Jan. 18, 2017

(65) Prior Publication Data

US 2018/0203874 A1    Jul. 19, 2018

(51) Int. Cl.
*G06F 16/182* (2019.01)
*G06F 16/14* (2019.01)

(52) U.S. Cl.
CPC ........ *G06F 16/1824* (2019.01); *G06F 16/148* (2019.01); *G06F 16/182* (2019.01)

(58) Field of Classification Search
CPC ... G06F 16/1824; G06F 16/182; G06F 16/148
See application file for complete search history.

(56) References Cited

U.S. PATENT DOCUMENTS

| 8,983,899 B1 | 3/2015 | Ghait et al. |
| 2006/0253435 A1 | 11/2006 | Nishizawa et al. |
| 2010/0299337 A1* | 11/2010 | Aurin ................... G06F 16/2453 707/759 |
| 2011/0145246 A1* | 6/2011 | Prager ..................... G06F 16/30 707/737 |
| 2016/0012051 A1* | 1/2016 | Zoryn ................. G06F 16/2458 707/739 |
| 2016/0232059 A1 | 8/2016 | Khurange et al. |
| 2017/0220634 A1* | 8/2017 | Kanaujia ............. G06F 16/9027 |
| 2017/0270149 A1* | 9/2017 | Grosman ............. G06F 16/2358 |

* cited by examiner

*Primary Examiner* — Matthew J Ellis
(74) *Attorney, Agent, or Firm* — Griffiths & Seaton PLLC

(57) ABSTRACT

Embodiments for space-efficient secondary indexing on distributed data stores in a networked computing environment by a processor. Replicas of corresponding master data at a file system level of a distributed file system (DFS) are sorted for creating secondary indexes of the replicas on different columns of a database table, wherein existing replication data is leveraged for the sorting.

12 Claims, 9 Drawing Sheets

SPACE-EFFICIENT SECONDARY INDEXING ON DISTRIBUTED DATA STORES

BACKGROUND OF THE INVENTION

Field of the Invention

The present invention relates in general to computing systems, and more particularly to, various embodiments for space-efficient secondary indexing on distributed data stores in a networked computing environment using one or more computing processors.

Description of the Related Art

Computing systems may be found in the workplace, at home, or at school. Computer systems may include data storage systems, or disk storage systems, to process and store data. Computer systems may include one or more data stores. A data store refers to a data repository that uses a database to manage data stored in the data repository. A data store may include a plurality of computing nodes, each of which uses a database management system to manage data stored in a corresponding computing node.

As the technology field grows exponentially each year and ever-growing amounts of critical data are stored on storage systems, the need to store and access such data in a space-efficient manner becomes increasingly paramount. Consequently, the need for advancement in the data storage field is of great precedence.

SUMMARY OF THE INVENTION

Various embodiments for space-efficient secondary indexing on distributed data stores in a networked computing environment by a processor, are provided. In one embodiment, by way of example only, a method for space-efficient secondary indexing on distributed data stores in a networked computing environment, again by a processor, is provided. Replicas of corresponding master data at a file system level of a distributed file system (DFS) are sorted for creating secondary indexes of the replicas on different columns of a database table, wherein existing replication data is leveraged for the sorting.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
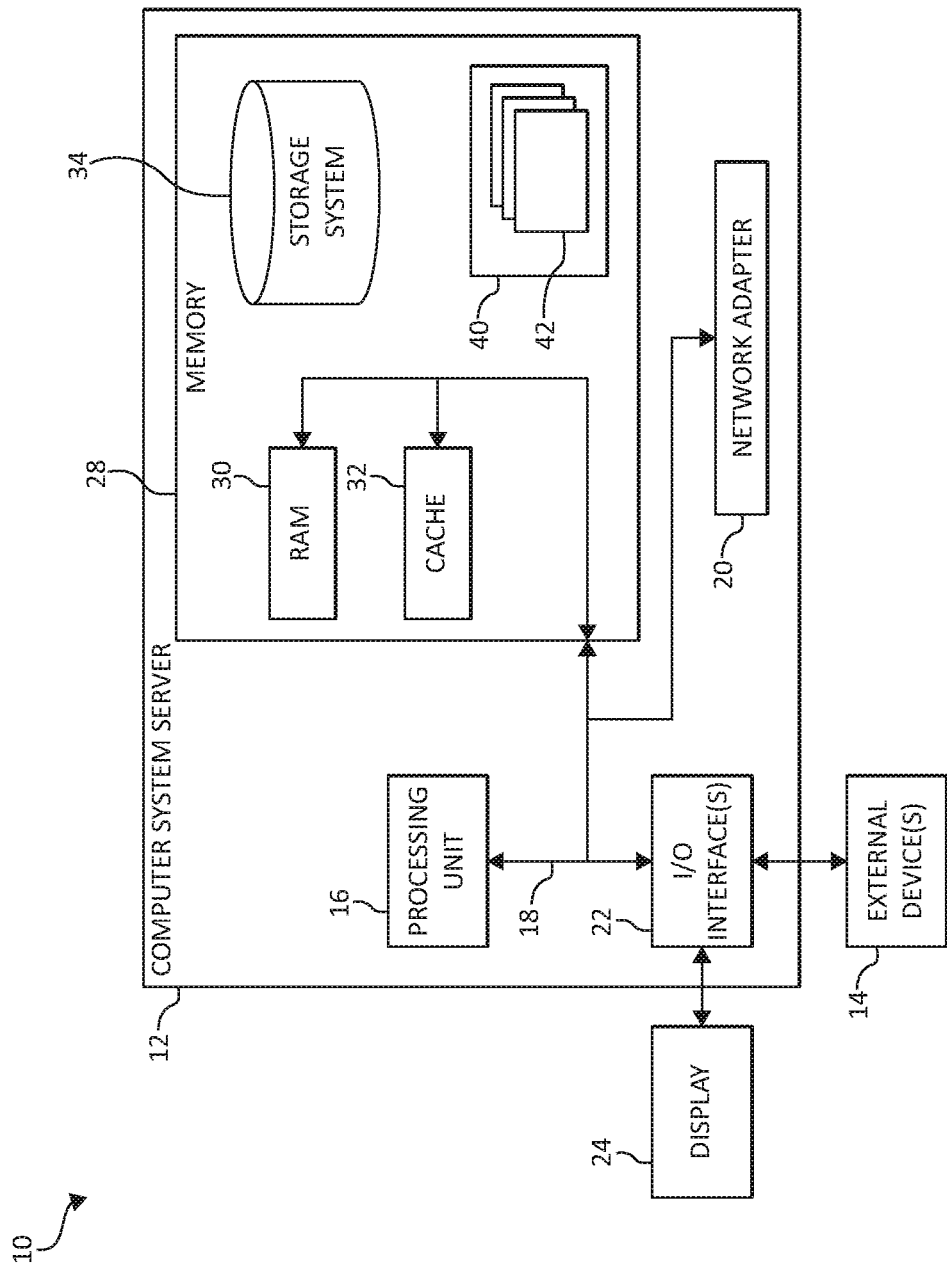
FIG. 1 is a block diagram depicting an exemplary cloud computing node according to an embodiment of the present invention.

A data store may include a plurality of computing nodes, each of which uses a database management system to manage data stored in a corresponding computing node. For example, scale-out data stores, referred as NoSQL data stores, is a class of database management systems that do not use a relational database model. A category of NoSQL data stores includes Log Structured Merge (LSM) Tree which is optimized for writing of data and MapReduce for scanning of data but is not optimized for point queries, e.g., a query directed to a specific datum. Examples of NoSQL data stores include, but are not limited to: Dynamo, BigTable, PNUTS, Cassandra®, HBase, etc. These data stores usually provide limited APIs (Application Programming Interfaces), e.g., Create, Read, Update, Delete operations, compared to relational databases, and focus on scalability and elasticity on commodity hardware. NoSQL data stores are particularly attractive for applications that perform relatively simple operations while needing low latency guarantees as data stored in NoSQL data stores scale to large sizes, e.g., 1 Petabyte. While these NoSQL data stores are a great fit for high-scale, low-complexity applications, as these applications get more complex, a lack of basic database functionality, e.g., secondary indexes, has become a stumbling factor. For example, distributed data stores can potentially store Petabytes of data, but the querying pattern they support is limited. This is due to the fact that in order to achieve data locality, the data must be fragmented based on a specific key. Therefore, distributed data stores achieve high performance when querying on the key. The mechanisms of the present invention provide a solution that enables querying on a different column from the row key without requiring a full table scan and without sacrificing significant disk space. Moreover, the present invention, at the same time, allows for other non-data store-related files stored in a distributed file system to not be affected and can be used by other DFS-based frameworks. In short, the mechanisms of the illustrated embodiments take advantage of a built-in replication characteristic of a DFS employing replication (e.g., Hadoop Distributed File System "HDFS") to achieve secondary indexing without requiring additional disk space. This may be performed by modifying existing replication data or replication files stored in the DFS and used by the distributed data stores to hold data. Improvements and modifications to replication indexing of the DFS are achieved by efficient lookups on secondary indices created from existing replicas of the distributed data store.

In one aspect, the present invention provides for space-efficient secondary indexing on distributed data stores in a networked computing environment, again by one or more processors. Replicas of corresponding master data at a file system level of a distributed file system (DFS) are sorted for creating secondary indexes of the replicas on different columns of a database table, wherein existing replication data is leveraged for the sorting.

In an additional aspect for space-efficient secondary indexing on distributed data stores, file system-level replication may be used for resilience, whereby replicas corresponding to the same master data can be sorted against different columns (as materialized on storage medium). One or more optimal replicas (e.g., replicas sorted on similar columns that match or correspond to a query) may be identified, queried, and/or written on the distributed file system materializing a database table, given a database query. One or more replicas at the file system level may be leveraged for sorting each replica on columns in a database table and at the same storage cost as the non-secondary indexed data store without causing any changes to the file system (e.g., no additional space required). Secondary indexing on top is closing the loop in terms of taking full advantage of the throughput available (distributed tables), both for primary and secondary key lookups. That is, secondary indexing takes full advantage of the distributed nature of the data store for both queries on the primary key and the secondary columns. Data may be collocated in a store system (e.g., a disk) to enable range queries.

It is understood in advance that although this disclosure includes a detailed description on cloud computing, implementation of the teachings recited herein are not limited to a cloud-computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 12.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
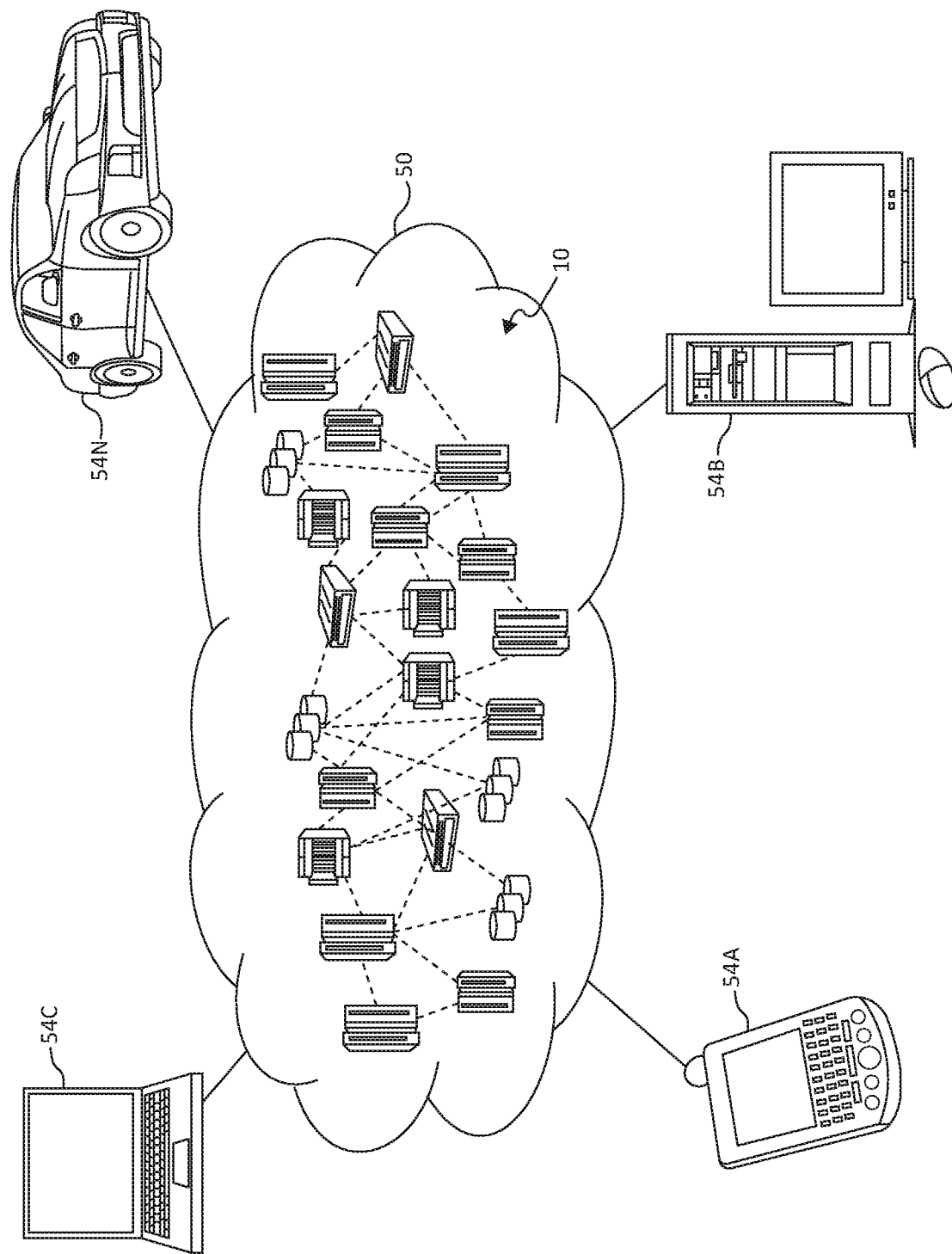
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
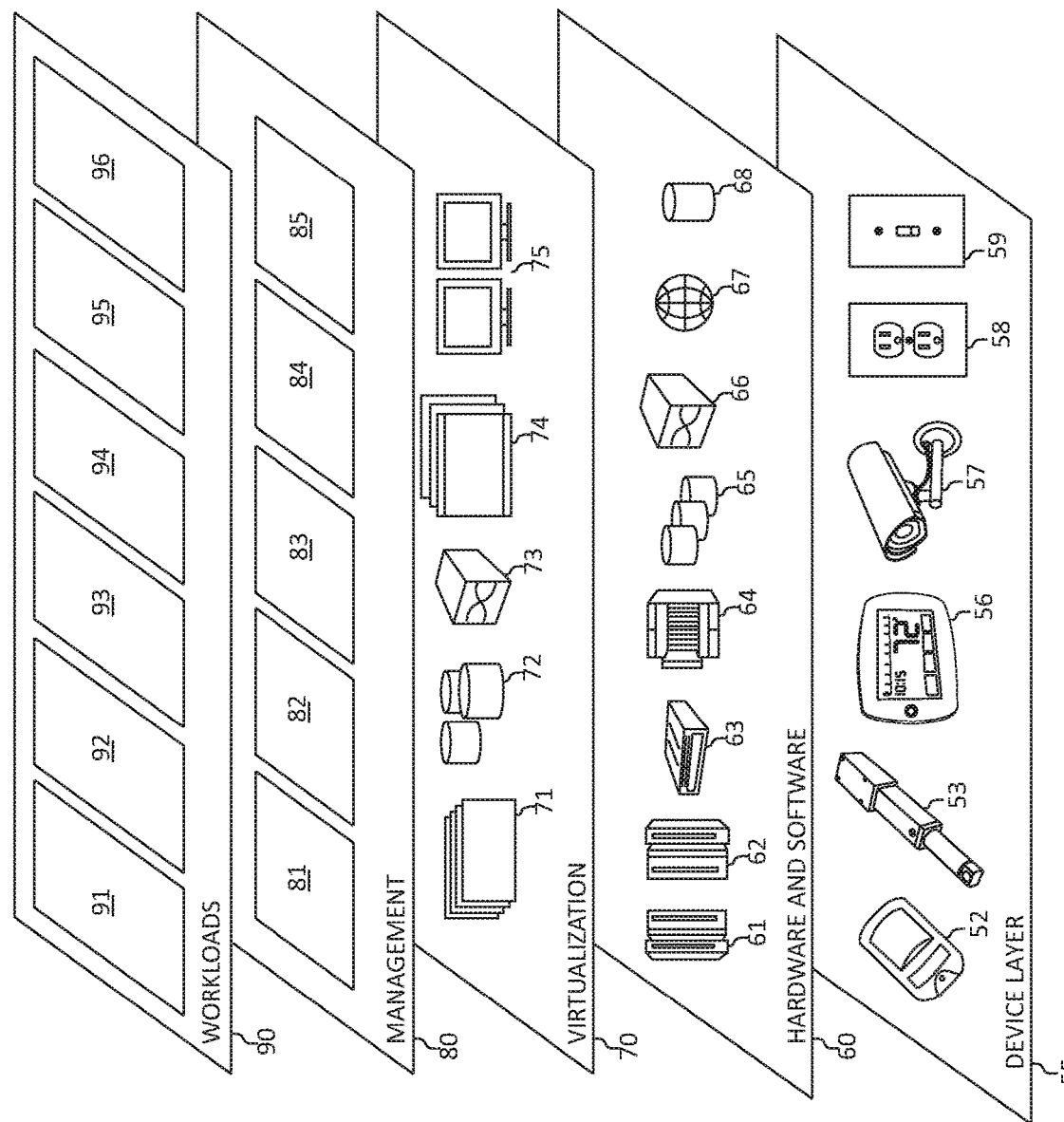
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various space-efficient secondary indexing on distributed data stores workloads and functions 96. In addition, space-efficient secondary indexing on distributed data stores workloads and functions 96 may include such operations as data analytics, data analysis, and as will be further described, notification functionality. One of ordinary skill in the art will appreciate that the space-efficient secondary indexing on distributed data stores workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

Figure 4:
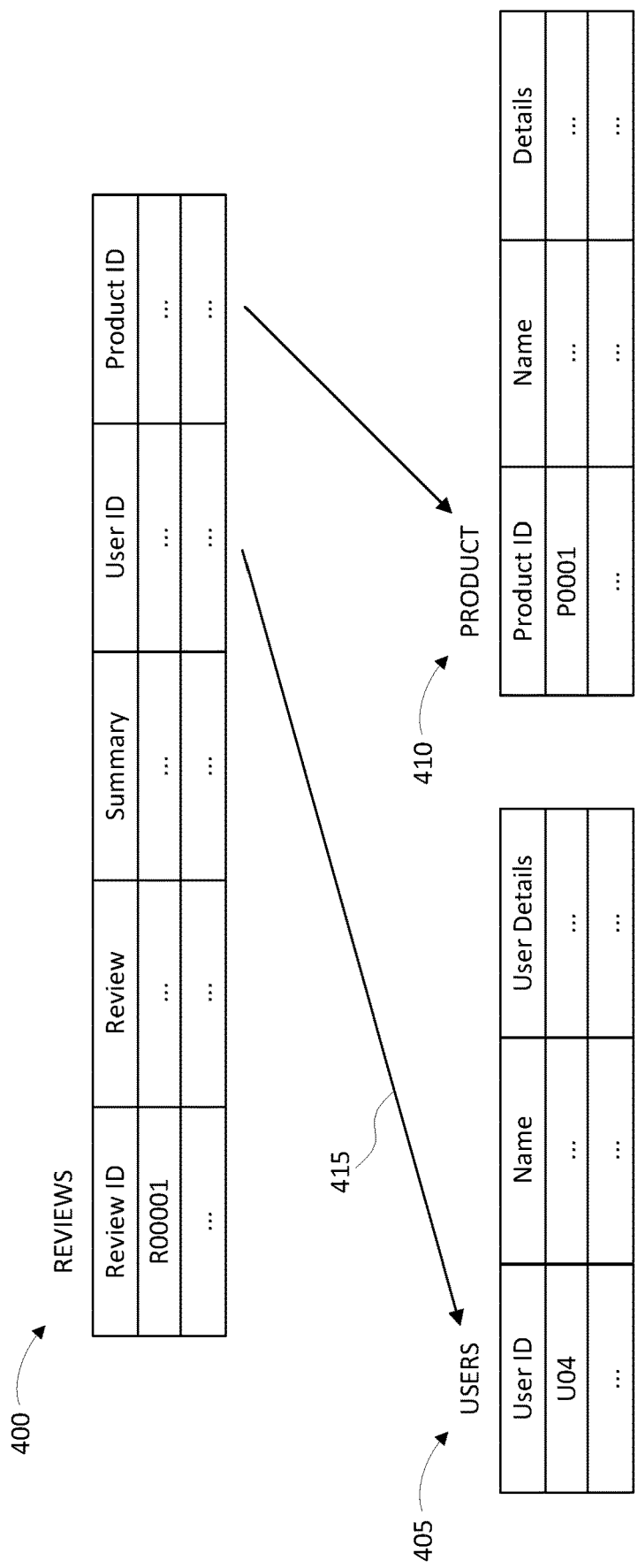
FIG. 4 is an additional block diagram depicting exemplary three tables using a database schema according to an embodiment of the present invention.

To address challenges in flexible schema and elasticity while providing space-efficient secondary indexing on distributed data stores, data stores dealing with columns, key/value pairs, documents and graphs have emerged and collectively identified as NoSQL data stores. A NoSQL data store, e.g., HBase, that supports a convergence of transactional and analytics workloads is able to offer balanced "read" and "write" performance. Consider a web application that manages social reviews (e.g., yelp.com). Such an application tracks reviews posted by users about business, e.g., restaurants, bars, clubs, etc. A common query is to list all reviews by a certain criteria, e.g., of a particular restaurant, by a particular user. A schema in FIG. 4 shows exemplary three tables: "Users" table 405, "Product" table 410, and "Reviews" table 400. In any scale-out data store, i.e., a data store that can increase its data storage capacity as a demand for the data storage increases, the tables 400-410 can be partitioned across a cluster of computing nodes. A given table can be partitioned by using one attribute. While a query can be served using a full table scan, e.g., scanning of tables 400-410, this full table scan would incur an unacceptable latency to an interactive web application, e.g., "yelp.com".

In a distributed data store, data are partitioned into regions, e.g., countries or counties or states, etc. From the perspective of indexes' scope, there are two types of indexes: a local index and a global index. A local secondary index is an index on data in a given region and co-located with a data region. In contrast, a global index indexes all the data in the table, and is potentially itself partitioned across all nodes. An advantage of a global index is in handling of highly selective queries, i.e., queries whose results reside in only a small number of regions, e.g., one or two regions. This is because a global index has an overall knowledge of data locations, and sends queries only to those regions that actually contain required data. A drawback of the global index is that an update of the global index incurs remote procedure calls (RPC) and results in additional latency when data and index are not collocated. On the other hand, a local index has an advantage of a fast index update, e.g., within a couple of milliseconds, because of its collocation with a data region. A drawback of the local index is that every query has to be broadcast to each region, thus the query is costly especially for highly selective queries.

Consider a query, for example, "Get all reviews by user u" on the "Reviews" table 400 shown in FIG. 4 that includes a secondary index 415 on the "Users" table 405. With local indexes, the query would need to be broadcasted to all the nodes in a cluster, and every node would send results of probing the local index to a coordinator who would combine the results before sending them back to a client node which sent the query. With global indexes, upon receiving the query, a data store will be able to locate exactly a node (or a small set of nodes) that includes relevant values and return a pointer to an original row that includes data that client looks for. For an interactive application, global indexes better support low-latency queries at large volumes, e.g., 1 million queries per day. If queries are uniformly distributed over a key-space (i.e., all the possible keys used in a data table that records data), with global indexes, a total throughput is limited by a throughput of a single node since every node has to participate in every query. For global indexes, in the best case, a total throughput of a data store can be the sum of throughputs of all the nodes in the data store. The worst case for the global indexes is when all the queries are directed to a single key whose index has to be served by a single node, in which the throughput of that single node determines the total throughput of a data store.

A central data structure used in NoSQL data stores, for example, BigTable is a Log-Structured-Merge (LSM) Tree. In contrast to B-Trees, i.e., a binary tree which can include a plurality of leaf nodes, LSM Trees are well suited to high-update ratio workloads (e.g., frequent review updates in yelp.com) because they only incur sequential I/O for "writes," and incur random I/O only for "reads."

However, a design and implementation of secondary indexes in a distributed LSM is not trivial, for the following reasons. Firstly, workloads of Internet applications are becoming more write-intensive with a proliferation of click streams, GPS locations, sensors events, etc. LSM is designed to address this challenge by optimizing a latency of writes. In the meanwhile, ad hoc queries are still important to make use of data stored in LSM. While indexes improve random read performance, the indexes have inevitably negative impact on write performance.

An issue (i.e., index's overhead to data write) applies to RDBMS (Relational Database Management System) and is not unique for LSM. However, the impact on a "write" (i.e., inserting a new data entry into a data table) can be more serious in LSM stores given a nature of its underlying data structure: in LSM there is no in-place update and consequentially, "insert" and "update" are indistinguishable. This characteristic results in that, an index update needs to incur a data read operation into a data table in order to remove a stale index entry. That is to say, a data read operation is added into a path of a data write operation. For example, in HBase (i.e., an implementation of LSM) a data write operation takes a couple of milliseconds but a data read operation can take over ten milliseconds. NoSQL data stores including those LSM-based data stores, are partitioned and distributed to handle huge volumes of data, e.g., 10 petabytes. Presumably, any index used in a NoSQL data store is to be large, too.

LSM-Tree Model

Figure 5:
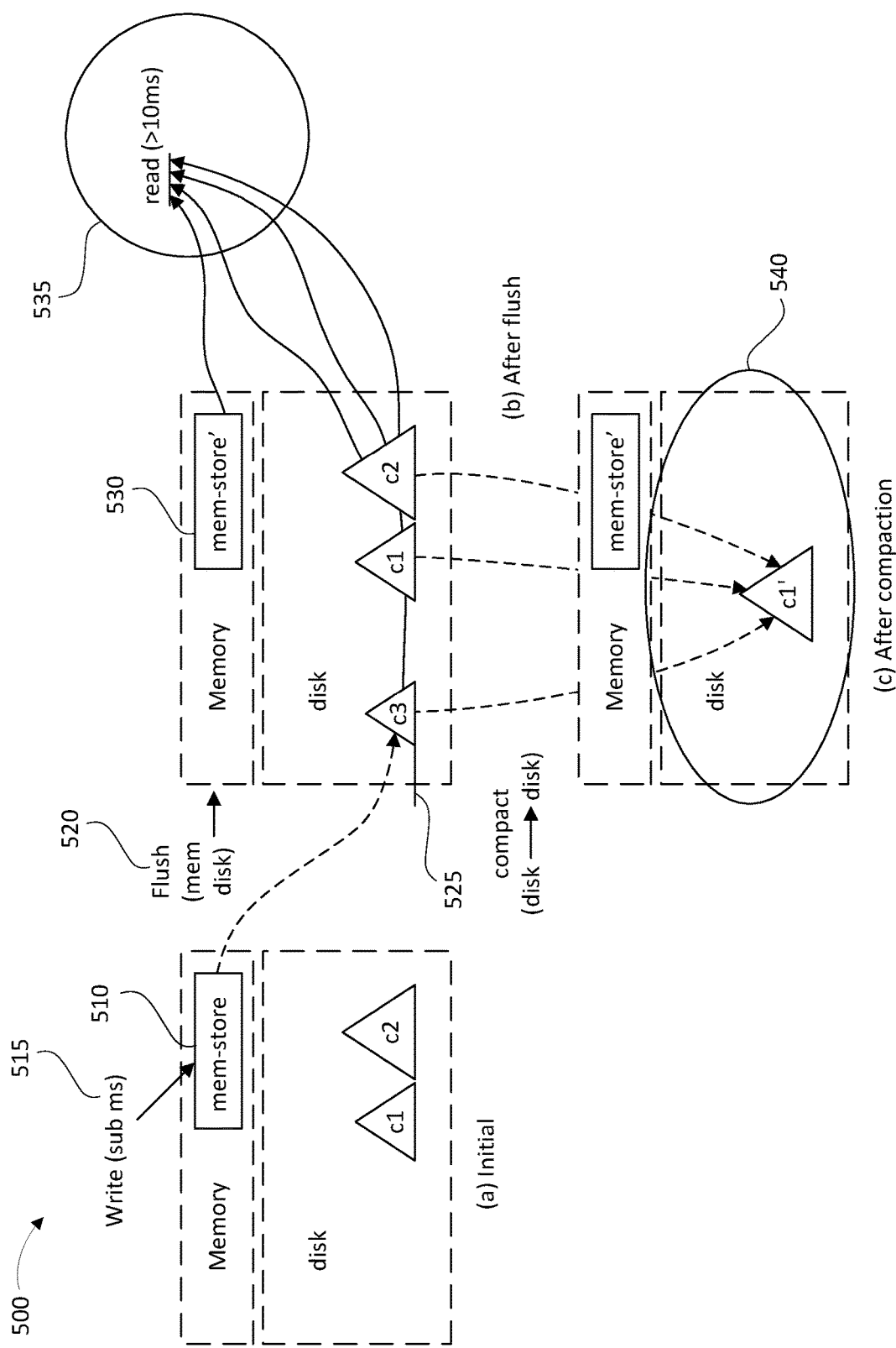
FIG. 5 is an additional block diagram depicting Log Structured Merge (LMS) Tree according to an embodiment of the present invention.

LSM-Tree prevails in workloads with a high rate of data record insertions and deletions. LSM-Tree defers and batches data changes, by cascading them from a memory to storage device (e.g., a disk, etc.) in a batch manner. LSM-Tree includes an in memory store, e.g., in a form of a tree or map, and multiple immutable data storages, e.g., usually in a form of a B-tree or its variants. For example, LSM-Tree in FIG. 5(a) includes an in memory store (e.g., "mem-store" in FIG. 5) and two disk stores C1 and C2. Operations on LSM-Tree are illustrated briefly in FIG. 5. In FIG. 5(a), writing 515 into LSM-Tree is an insertion into a mem-store 510. In practice, a data write operation usually also involves an appending to a commit log for a durability purpose, e.g., in order to recover from a mem-store failure. Therefore, a data write operation that includes a memory store operation and an optional sequential I/O, is fast 515, e.g., less than a millisecond. When a storage capacity of a mem-store reaches a certain volume, its content is flushed, i.e., pushed 520 to a storage device, e.g., a disk C3 525. For example, the mem-store 510 in FIG. 5(a) is flushed (i.e., pushed) into a new storage device, e.g., disk C3 525 shown in FIG. 5(b). After the push 520, the mem-store becomes empty and denoted as a mem-store' 530 in FIG. 5(b). With this procedure, every write is virtually an appending; an update or deletion to an existing data is achieved by adding a new version of the data (or setting an invalidation bit in case of deletion) into the mem-store. By this means, LSM-Tree has no in-place update and as a result is able to keep multiple versions of data. To retrieve either one or more versions of data, the mem-store and all disk stores need to be scanned 535 (shown in FIG. 5(b)). Therefore, a data read operation may include multiple random I/O and is usually slow, e.g., more than 10 milliseconds. To alleviate this slow data read operation and consolidate multi-versions of data into a single place, multiple disk stores are periodically flushed, merged and compacted. As an example, storage devices C1, C2 and C3 are compacted 540 into a storage device C1', as shown in FIG. 5(c).

Apache HBase is a LSM-Tree data store. In HBase, data is organized in tables. A table includes rows that are identified by a (primary) row key. Each row may include an arbitrary number of named columns with corresponding values and timestamps. Columns may be organized into column families, and columns in a single family find them co-located on a storage device, e.g., a disk. Each column family may be partitioned and stored in multiple computing nodes, and in each computing node each column may be stored as a LSM-tree. The following lists a subset of HBase's data table storage and retrieval methods: put(table, key, colname, colvalue): Insert a column value ("colvalue") into a column corresponding to "colname" into a row corresponding to "key" in a table corresponding "table." get(table, key, colname): Read a column value and its timestamp from an entry at a column corresponding to "colname" and at a row corresponding "key" in a table corresponding "table." get(table, key, colname, minTime, maxTime): Read a column value and its timestamp from an entry at a column corresponding to "colname" and at a row corresponding "key" subject to the timestamp being between 'minTime' (i.e., a minimum time) and 'maxTime' (i.e., a maximum time) from a table corresponding "table." delete (table, key, colname): Delete a column corresponding to "colname" from a row corresponding "key" in a table corresponding "table."

Figure 6:
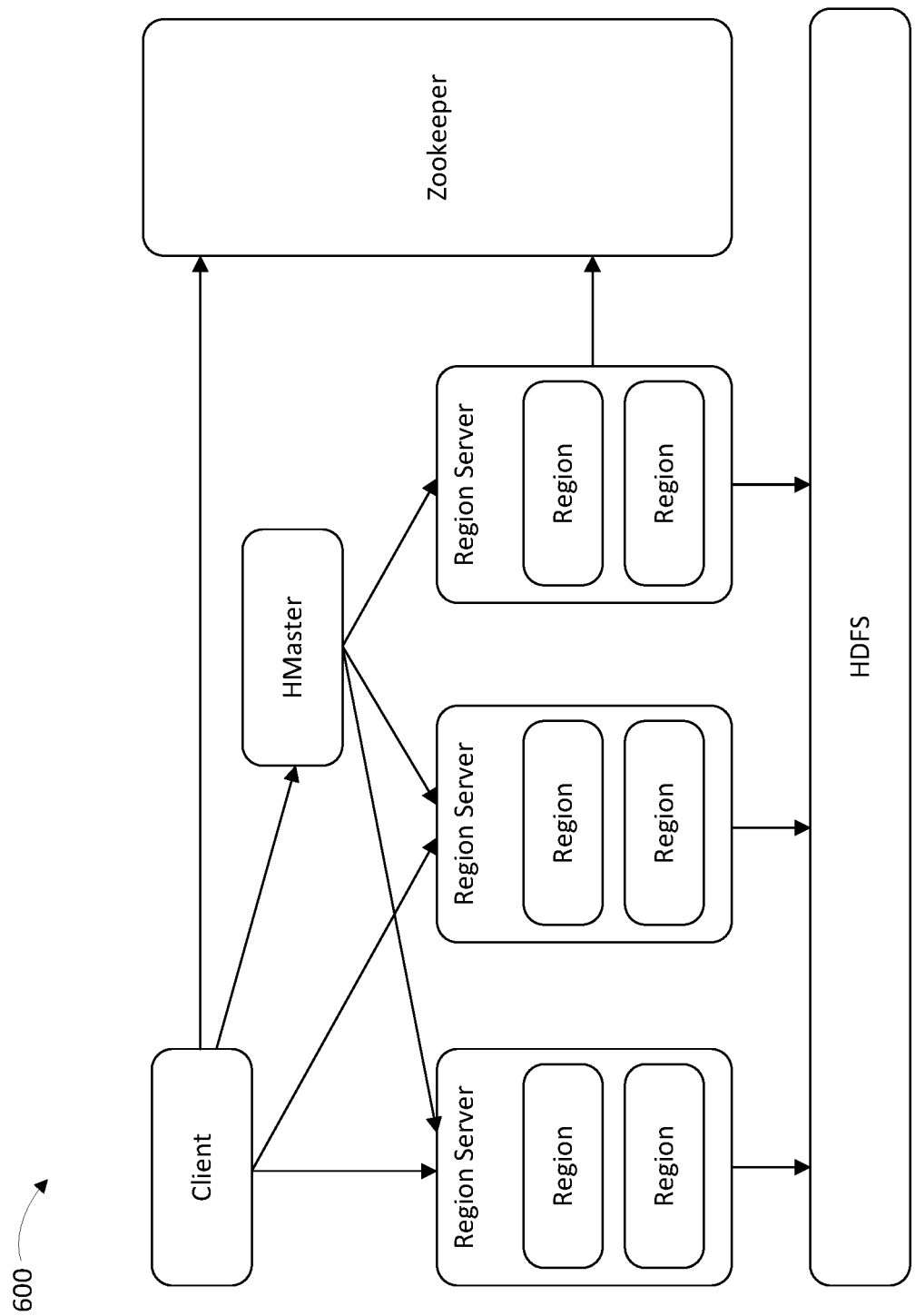
FIG. 6 is an additional block diagram depicting HBase architecture according to an embodiment of the present invention.

As previously stated, the mechanisms of the illustrated embodiments take advantage of a built-in replication characteristic of a DFS employing replication (e.g., Hadoop Distributed File System "HDFS") to achieve secondary indexing without requiring additional disk space. As shown in FIG. 6, a block diagram depicts an HBase architecture 600 according to an embodiment of the present invention. The HBase architecture 600 may include an HMaster server ("master"), a region server, a Zookeeper and an HDFS. The master server may be responsible for assigning one or more regions to the region servers, monitor the regions and perform all administration functions. There may be multiple masters on an HBase installation, but there should only be one active master and the remaining masters be in a standby mode. The region servers may host multiple regions of a logical table. Regions may be segments of data stored in a same table. The region server may be aware of the first and last row key of those entries. Moreover, region servers may store a reference to the locations of the data files of the regions in the DFS. A Region Server may be responsible for serving "puts" functions and "gets" functions for keys that fall in a corresponding Region. A region server may serve more than one Region. The Zookeeper may be responsible for coordinating the shared state between the components. The Zookeeper may also manage and/or assist with managing the cluster of region servers. The HDFS may be the distributed file system in which the data files are stored. HDFS may refer to a data storage system that stores huge data (e.g., 40 petabytes) and provides the data at high bandwidth (1 gigabyte/sec, etc.) to applications.

The HBase architecture 600 provides query only for the row key. The client can issue queries that target one row or a range of row keys. When the client issues a query, the HBase architecture 600 (HBase cluster) is contacted to retrieve the Region Servers hosting the row key(s) in question. Then the region servers read the data files that host the requested row key ranges. However, there is no API call to retrieve data based on the value of a column and thus a full table scan is required. Thus, mechanisms of the present invention provide for space-efficient secondary indexing on distributed data stores by taking advantage of a built-in replication characteristic of a DFS employing replication (e.g., Hadoop Distributed File System "HDFS") to achieve secondary indexing without requiring additional disk space.

Figure 7:
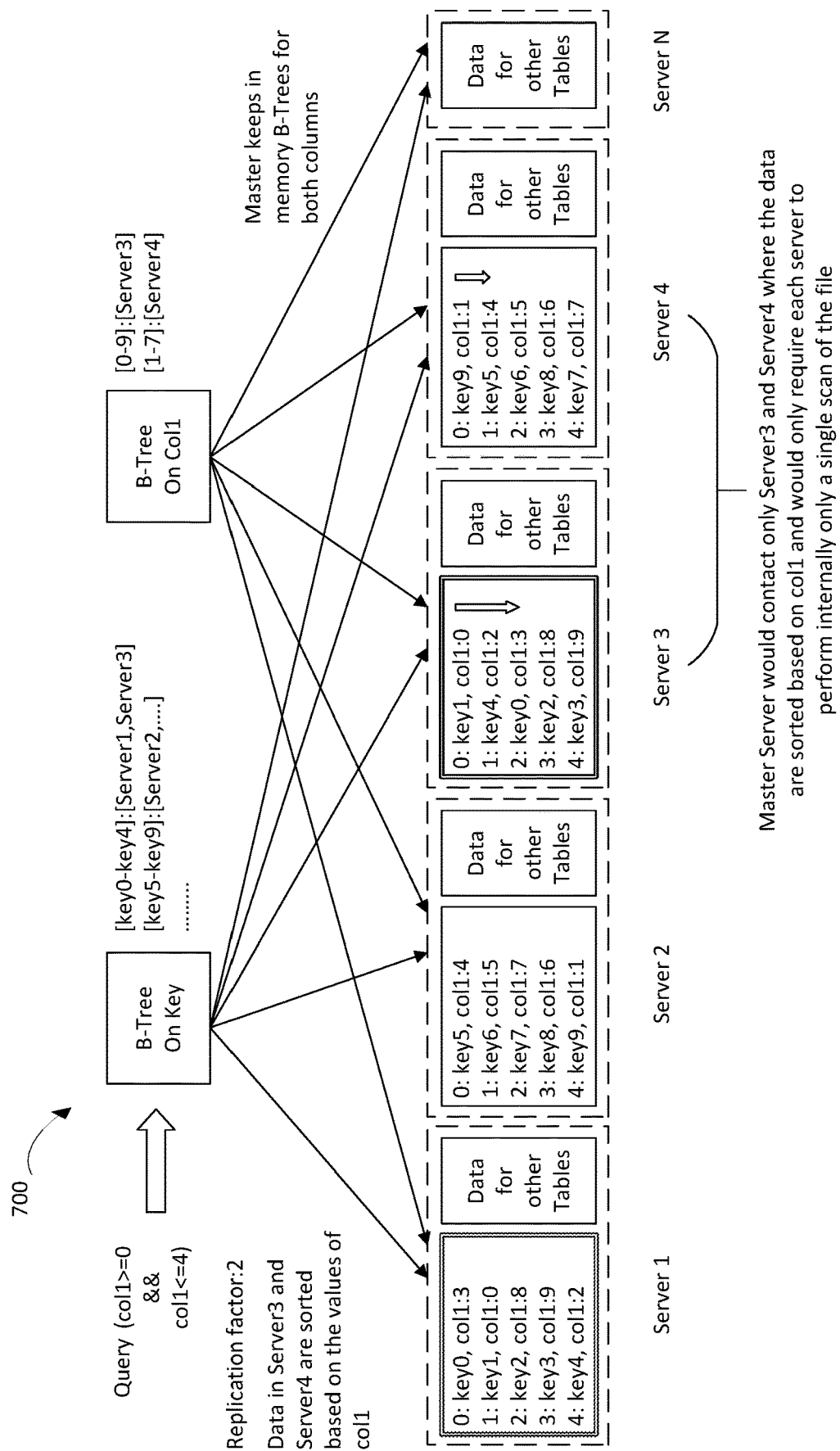
FIG. 7 is an additional block diagram depicting a query search using sorted columns of secondary indexes according to an embodiment of the present invention.

Turning now to FIG. 7, a DFS 700 depicts a query search using sorted columns of secondary indexes that may employ the replication characteristic of a DFS employing replication. DFS 700 depicts one or more servers (e.g., servers 1-N). One or more data tree structures such as, for example B-Tree "on key" and B-Tree "on Col1", may be stored and maintained in the master server (e.g. "master" of FIG. 6). That is, "in-memory B-Trees on non-key columns" may be maintained and stored in memory. The B-tree is maintained in the master memory and references the data. The B-tree on key references that keys 0-4 on located on server 1 and server 3 and references that keys 5-9 are located on server 2. For the secondary indices, another data store tree or B-tree (e.g., B-Tree on Col1) is needed to know where the replicas are located according to the different columns. For example, B-Tree on Col1 indicated that replica entries 0-9 for column 1 are located on server 3 and replica entries 1-7 for column 1 are located on server 4. Also, by using the "in-memory B-Trees on non-key columns" stored in memory, the speed and time for performing a one-row query may be equivalent and the same for range of queries.

Replicas of corresponding master data at a file system level of the DFS may be sorted for creating secondary indexes of the replicas on different columns of a database table. The primary indexes may be replicas sorted by key values. The existing replication data may be leveraged for the sorting. Thus, the present invention provides a solution that enables querying on a different column from the row key without requiring a full table scan and without sacrificing significant disk space.

Also, the master may maintain a number of the secondary indexes of the sorted replicas by column equal to a replication factor, wherein the replication factor is equal to a number of the different columns. As illustrated in DFS 700, the replication factor value is "2" based on the different columns. To further illustrated how the replication factor value is equal to the number of different columns or "2" is as follows. If, for example, data is represented in the table in entries of [key, column1] the entries would be as follows:
[key0,3]
[key1,0]
[key2,8]
[key3,9]
[key4,2]
[key5,4]
[key6,5]
[key7,7]
[key 8,6]
[key 9,1]
Server 1 hosts:
[key0,3]
[key1,0]
[key2,8]
[key3,9]
[key4,2]
Server 2 hosts:
[key5,4]
[key6,5]
[key7,7]
[key 8,6]
[key 9,1]

Since the replication factor is 2, there would be one more copy of the data in another server. In this way, Server 3 hosts the same data with Server 1 but sorted on the column1, as illustrated in FIG. 7

The master may also maintain in memory one or more data tree structures, representing the secondary indexes of the sorted replicas on the different columns, equal to the replication factor. This allows for performing a lookup operation on the one or more data tree structures (e.g., B-Tree on col1) for identifying one or more computing nodes having the replicas with a similar column for performing the query. The replicas of the secondary indexes may be selected corresponding to query by sequentially accessing each of the sorted replicas on the different columns, wherein the sorted replicas are collocated on one or more computing nodes.

Assume now a database table (not shown for illustrative convenience) contains 10 rows and the values of the non-key column range from 0 to 9. A query is issued with a request for data from columns equal to or greater than 0 and equal to or less than column 1. A lookup operation may be performed on the one or more data tree structures, such as, for example "B-Tree on Column 1" for identifying one or more computing nodes having the replicas with a similar column for performing the query. That is, the B-Tree data structures indicate that replicas sorted for columns equal to or greater than 0 and equal to or less than column 4 (e.g., columns 0-4) are located on servers 1 and servers 3. The master would only contact servers 3 and servers 4 where the replicas are sorted based on column 1 and would only require each server to internally perform a single scan of the data file. That is, the replica data of server 3 and server 4 are sorted according to column 1 for performing the query for replicas 0-4. The data is accessed sequentially on servers 3 and servers 4 (as indicated in the arrows). The replicas are sorted sequentially for the column, such as column 1 (e.g., column 1: 0, column 1: 2, column 1: 3, column 1: 8, column 1: 9 of server 3 and column 1: 1, column 1: 4, column 1: 5, column 1: 6, column 1: 7 of server 4). In this way, rather than having to go through an entire table scan to determine if each line entry of the data replicas that are sorted by key value and then keep or discard the replicas, the sorted replicas that are indexed (e.g., secondary indices) according to the columns allow for sequential access and then the scan may terminate once the entries no longer comply with the query, which is illustrated by way of comparison of server 1 (sorted only by the primary index of key values) and server 3 (sorted by the secondary index of columns). This increases the performance and search time for the query, eliminates any need for additional data space, and requires only a partial table scan as compared to the full table scan.

Figure 8:
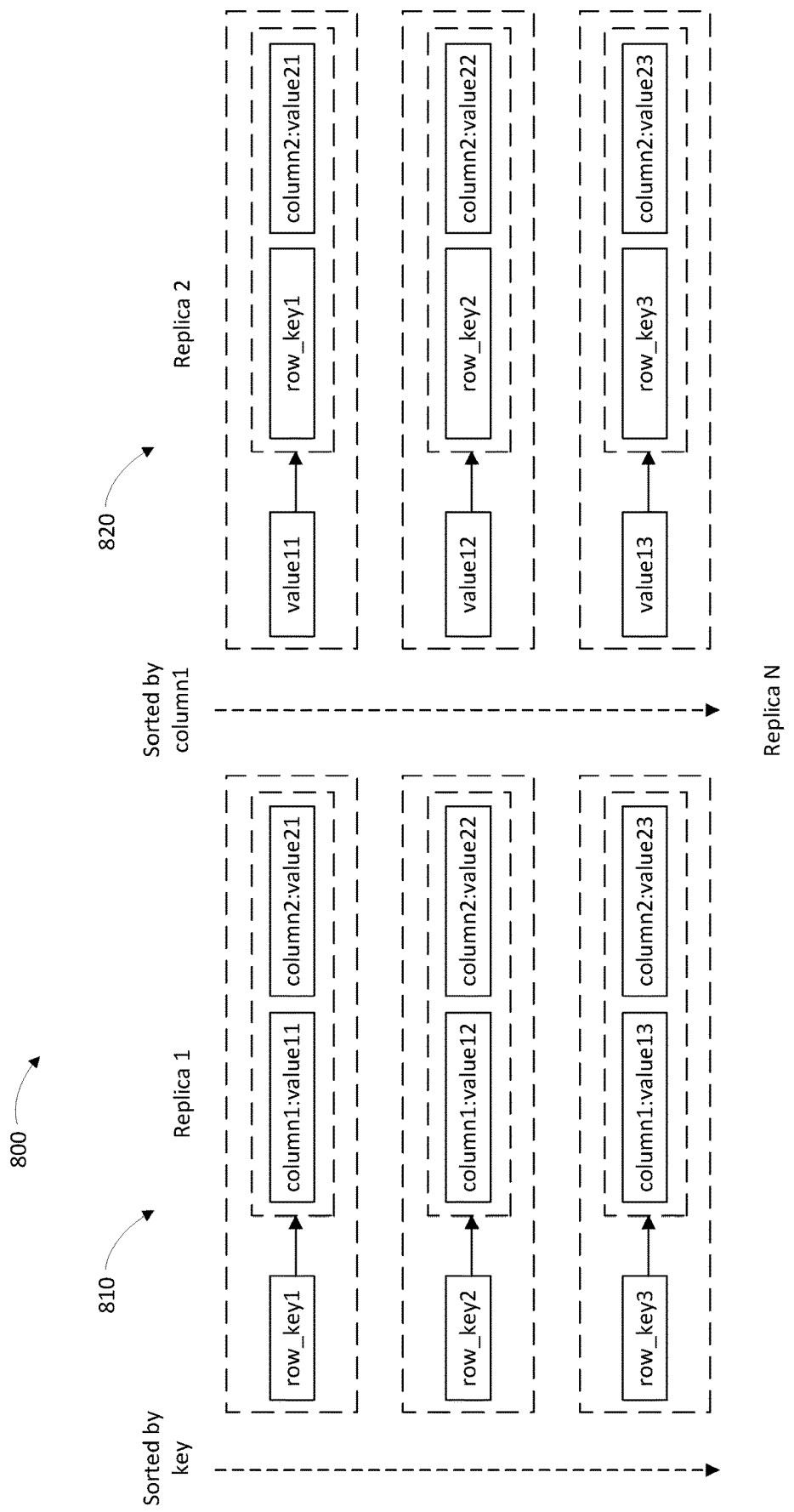
FIG. 8 is an additional block diagram depicting a comparison of replicas sorted by keys as compared to replicas sorted by columns (secondary indices) according to an embodiment of the present invention.

Turning now to FIG. 8, additional block diagram 800 depicts a comparison of replicas sorted by keys as compared to replicas sorted by columns (secondary indices). As depicted, a first replica 810 ("Replica 1") of master data are sorted by key value such as, for example, key 1, key 2, and key 3. Key 1 includes column 1 with value 11 and column 2 with value 21. Key 2 includes column 1 with value 12 and column 2 with value 22. Key 3 includes column 1 with value 13 and column 2 with value 23. In comparison, secondary indices are created by sorting the data table according to the different columns (e.g., sorting the replicas by column 1), as depicted in the second replica 820. Thus, on column 1, the same data is included as the primary indices of Replica 1, but the values are sorted sequentially according to the columns. As depicted, column 1 is sorted first by value 11, value 12, and then value 13. Value 11 includes key 1 and column 2 with value 21. Value 12 includes key 2 and column 2 with value 22. Value 13 includes key 3 and column 2 with value 23. It should be noted that FIG. 8 is illustrated as an example, but can be generalized based on the replication factor to increase the number of indices. In this way, the present invention may search for matching replicas of the secondary indexes that are sorted on similar columns that are identified using the one or more data tree structures.

Thus, the present invention eliminates any requirement for additional disk space to create secondary indexes on distributed data stores. Also, the cost of additional space or random access memory ("RAM") required to hold the additional indexes is insignificant compared to the cost of creating a new copy of the data sorted by the column for creating a secondary index by: 1) indexes in distributed data stores are lightweight and are just references to where the data are located, and 2) modifications proposed to the DFS keep all of the built-in features such as failover and high availability.

Figure 9:
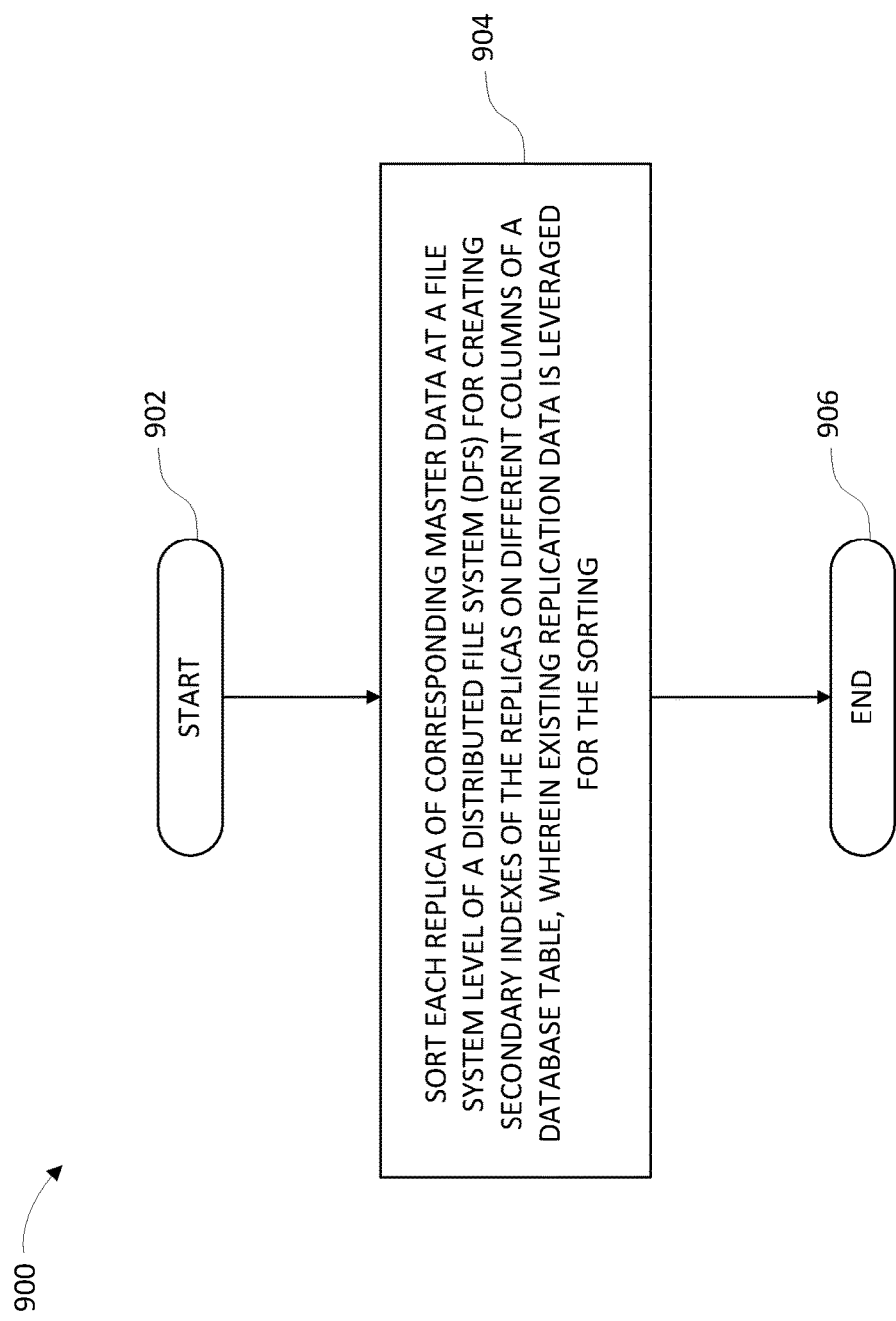
FIG. 9 is a flowchart diagram depicting an exemplary method for secondary indexing on distributed data stores in a networked computing environment by a processor, again in which aspects of the present invention may be realized.

FIG. 9 is a flowchart diagram depicting an exemplary method for secondary indexing on distributed data stores in a networked computing environment. The functionality 900 may be implemented as a method executed as instructions on a machine, where the instructions are included on at least one computer readable medium or one non-transitory machine-readable storage medium. Starting in block 902, replicas of corresponding master data at a file system level of a distributed file system (DFS) may be sorted for creating secondary indexes of the replicas on different columns of a database table. Existing replication data may be leveraged for the sorting, as in block 904. The method 900 ends (block 906).

In one aspect, in conjunction with and/or as part of at least one block of FIG. 9, the operations of method 900 may include each of the following. The operations of method 900 may maintain in memory one or more data tree structures, representing the secondary indexes of the sorted replicas on the different columns, equal to the replication factor. A lookup operation may be performed on the one or more data tree structures for identifying one or more computing nodes having the replicas with a similar column for performing the query.

The operations of method 900 may search for matching replicas of the secondary indexes that are sorted on similar columns that are identified using the one or more data tree structures. Secondary index of the replicas corresponding to query may be identified, collected, determined, and/or located by sequentially accessing each of the sorted replicas on the different columns, wherein the sorted replicas are collocated on one or more computing nodes.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method, by a processor, for space-efficient secondary indexing on distributed data stores in a networked computing environment, comprising:
   sorting replicas of corresponding master data at a file system level of a distributed file system (DFS) for creating secondary indexes of the replicas on different columns of a database table, wherein existing replication data is leveraged for the sorting;
   searching for the replicas having a similar column for performing a query; wherein the secondary indexes of the replicas are sorted to allow for sequential access of the replicas stored on particular ones of a plurality of computing nodes identified according to the similar column, such that the searching of the different columns is performed on only a subset of the database table and terminates upon determining that entries of the secondary indexes no longer comply with the query;
   maintaining a number of the secondary indexes of the sorted replicas equal to a replication factor, wherein the replication factor is equal to a number of the different columns; and
   maintaining in memory one or more data tree structures, representing the secondary indexes of the sorted replicas on the different columns, equal to the replication factor.

2. The method of claim 1, further including performing a lookup operation on the one or more data tree structures for identifying the particular ones of the plurality of computing nodes having the replicas with the similar column for performing the query.

3. The method of claim 1, further including searching for matching replicas of the secondary indexes that are sorted on similar columns that are identified using the one or more data tree structures.

4. The method of claim 1, further including selecting a secondary index of the replicas corresponding to the query by sequentially accessing each of the sorted replicas on the different columns, wherein the sorted replicas are collocated on the particular ones of the plurality of computing nodes.

5. A system for space-efficient secondary indexing on distributed data stores in a networked computing environment, comprising:
   one or more computers with executable instructions that when executed cause the system to:
      sort replicas of corresponding master data at a file system level of a distributed file system (DFS) for creating secondary indexes of the replicas on different columns of a database table, wherein existing replication data is leveraged for the sorting;
      search for the replicas having a similar column for performing a query; wherein the secondary indexes of the replicas are sorted to allow for sequential access of the replicas stored on particular ones of a plurality of computing nodes identified according to the similar column, such that the searching of the different columns is performed on only a subset of the database table and terminates upon determining that entries of the secondary indexes no longer comply with the query;
      maintain a number of the secondary indexes of the sorted replicas equal to a replication factor, wherein the replication factor is equal to a number of the different columns; and
      maintain in memory one or more data tree structures, representing the secondary indexes of the sorted replicas on the different columns, equal to the replication factor.

6. The system of claim 5, wherein the executable instructions that when executed cause the system to perform a lookup operation on the one or more data tree structures for identifying the particular ones of the plurality of computing nodes having the replicas with the similar column for performing the query.

7. The system of claim 5, wherein the executable instructions that when executed cause the system to search for matching replicas of the secondary indexes that are sorted on similar columns that are identified using the one or more data tree structures.

8. The system of claim 5, wherein the executable instructions that when executed cause the system to select a secondary index of the replicas corresponding to the query by sequentially accessing each of the sorted replicas on the different columns, wherein the sorted replicas are collocated on the particular ones of the plurality of computing nodes.

9. A computer program product for, by a processor, space-efficient secondary indexing on distributed data stores in a networked computing environment, the computer program product comprising a non-transitory computer-readable storage medium having computer-readable program code portions stored therein, the computer-readable program code portions comprising:

an executable portion that sorts replicas of corresponding master data at a file system level of a distributed file system (DFS) for creating secondary indexes of the replicas on different columns of a database table, wherein existing replication data is leveraged for the sorting;

an executable portion that searches for the replicas having a similar column for performing a query; wherein the secondary indexes of the replicas are sorted to allow for sequential access of the replicas stored on particular ones of a plurality of computing nodes identified according to the similar column, such that the searching of the different columns is performed on only a subset of the database table and terminates upon determining that entries of the secondary indexes no longer comply with the query;

an executable portion that maintains a number of the secondary indexes of the sorted replicas equal to a replication factor, wherein the replication factor is equal to a number of the different columns; and an executable portion that maintains in memory one or more data tree structures, representing the secondary indexes of the sorted replicas on the different columns, equal to the replication factor.

10. The computer program product of claim 9, further including an executable portion that performs a lookup operation on the one or more data tree structures stored in a master memory for identifying the particular ones of the plurality of computing nodes having the replicas with the similar column for performing the query.

11. The computer program product of claim 9, further including an executable portion that searches for matching replicas of the secondary indexes that are sorted on similar columns that are identified using the one or more data tree structures.

12. The computer program product of claim 9, further including an executable portion that selects a secondary index of the replicas corresponding to the query by sequentially accessing each of the sorted replicas on the different columns, wherein the sorted replicas are collocated on the particular ones of the plurality of computing nodes.

* * * * *